United States Patent
Fisher et al.

(10) Patent No.: US 9,216,422 B2
(45) Date of Patent: Dec. 22, 2015

(54) VERTICAL AXIS CENTRIFUGAL SEPARATOR

(75) Inventors: Russ Fisher, Millarville (CA); Darcy Smith, Okotoks (CA)

(73) Assignee: KAYDEN INDUSTRIES LIMITED PARTNERSHIP, Calgary (CA)

(*) Notice: Subject to any disclaimer, the term of this patent is extended or adjusted under 35 U.S.C. 154(b) by 1177 days.

(21) Appl. No.: 13/111,590

(22) Filed: May 19, 2011

(65) Prior Publication Data

US 2011/0287920 A1 Nov. 24, 2011

Related U.S. Application Data

(60) Provisional application No. 61/346,827, filed on May 20, 2010.

(51) Int. Cl.
*B04B 1/20* (2006.01)

(52) U.S. Cl.
CPC ........... *B04B 1/20* (2013.01); *B04B 1/2016* (2013.01); *B01D 2221/04* (2013.01); *B04B 2001/2033* (2013.01)

(58) Field of Classification Search
CPC .......................... B04B 1/20; B04B 2001/2016
USPC .......................................... 494/53, 83, 84, 63
See application file for complete search history.

(56) References Cited

U.S. PATENT DOCUMENTS

| | | | | |
|---|---|---|---|---|
| 293,314 A | * | 2/1884 | De Laval | 494/43 |
| 355,246 A | * | 12/1886 | Backstrom | 494/63 |
| 379,690 A | * | 3/1888 | De Laval | 415/202 |
| 1,572,299 A | * | 2/1926 | McEntire | 494/51 |
| 1,749,764 A | * | 3/1930 | Forsberg | 494/57 |
| 2,458,706 A | * | 1/1949 | Howe | 475/332 |
| 2,878,943 A | * | 3/1959 | Ziherl | 210/374 |
| 2,907,517 A | * | 10/1959 | Ziherl | 494/26 |
| 4,154,394 A | * | 5/1979 | Reed | 494/38 |
| 5,203,762 A | * | 4/1993 | Cooperstein | 494/7 |

(Continued)

FOREIGN PATENT DOCUMENTS

| | | |
|---|---|---|
| CA | 2626814 | 9/2008 |
| EP | 1129782 | * 5/2001 |
| JP | 2003326195 | 11/2003 |
| JP | 2005144279 | 6/2005 |

OTHER PUBLICATIONS

International Search Report and Written Opinion of the International Searching Authority (ISA), Dated Aug. 24, 2011.

(Continued)

*Primary Examiner* — Charles Cooley
*Assistant Examiner* — Marc C Howell
(74) *Attorney, Agent, or Firm* — Goodwin Law; Linda M. Thompson

(57) ABSTRACT

A vertical separator has a bowl which is supported for rotation about a vertical axis and from beneath, providing an unobstructed inlet to the bowl. Conveyor flighting, located concentrically for independent co-rotation within the bowl, directs solids to the bottom of the bowl while the liquids flow along an annular clearance along the bowl wall to an upper end of the bowl. A feedstream, such as drilling mud shaker solids, which may otherwise require augers or the like to feed the feedstream through a conventional horizontal centrifuge, can be received at the inlet by gravity feed and residual liquids stripped therefrom.

35 Claims, 11 Drawing Sheets

(56) References Cited

U.S. PATENT DOCUMENTS

| | | | | |
|---|---|---|---|---|
| 5,277,809 A | * | 1/1994 | Eder | 210/380.1 |
| 5,354,256 A | * | 10/1994 | Knelson | 494/80 |
| 5,368,541 A | * | 11/1994 | Knelson | 494/37 |
| 6,439,394 B1 | * | 8/2002 | Eiderman et al. | 209/479 |
| 2008/0230491 A1 | | 9/2008 | Wick | |

OTHER PUBLICATIONS

English Translation of JP 2003326195—provided by ISA, Requested Aug. 2, 2011.

English Translation of JP 2005144279—provided by ISA, Requested Aug. 2, 2011.

* cited by examiner

VERTICAL AXIS CENTRIFUGAL SEPARATOR

CROSS-REFERENCE TO RELATED APPLICATIONS

This application is a regular application claiming priority of U.S. Provisional application 61/346,827, filed May 20, 2010, the entirety of which is incorporated herein by reference.

FIELD OF THE INVENTION

Embodiments of the invention relate to centrifugal separators for separating solids from liquids and, more particularly, to centrifugal separators which are rotated about a vertical axis.

BACKGROUND OF THE INVENTION

Centrifugal separators are well known for separating solids from liquids in a slurry feedstream. Particularly, such separators are known for high-volume separation of drill cuttings from drilling fluid in returned drilling muds. The ability to remove said solids is instrumental in the reuse and recycling of at least the liquid portion of the drilling mud.

In a typical drilling operation, drilling mud is pumped down the bore of a drill string to a drill bit. The mud acts to lubricate and carry drill cuttings to surface as the drilling mud returns through an annulus between the wellbore and the drill string. The drilling mud is first passed across a shale shaker, as is known in the art, to separate large solids therefrom. Smaller particulates pass through the screen of the shale shaker and remain in the fluid. Conventional centrifugal separators are used thereafter to remove particulates from the fluid, where the solids content of the fluid is typically less than the fluid content.

The larger solids which are rejected by the shale shaker typically retain some liquid portion of the drilling fluid. In many cases, the rejected solids, from the shale shakers, are mixed with an absorbent material such as sawdust to absorb remaining liquid therein which is sent for disposal, resulting in a loss of the liquid. The loss of even small amounts of liquid results in increased operational costs as well as an increased environment hazard. This may be of particular importance with respect to oil-based drilling muds or water-based drilling muds where the ability to strip liquid from a high-solids reject would result in significant cost savings.

In other cases, the rejected solids may be diluted with additional liquid, such as diesel, to decrease the solids content to permit separation of the solids therefrom using conventional vertical or horizontal centrifugal separators.

Vertical basket filter centrifuges are known for separation of solids from liquids, however such apparatus typically permit fine solids, such as solids less than 200 um, to pass through the basket filter with the recovered liquid. Contamination of the drilling fluid by the fine solids results in a drilling fluid which is not clean enough for reuse without further treatment.

Known horizontal centrifugal separators generally have a large footprint and require pumps to feed liquid, and/or require augers to feed solids, into the centrifuge. In many cases, such horizontal separators are only suitable for slurries having a relatively high liquid content. Slurries having relatively large solid contents, such as those containing about 90% solid, may be unpumpable.

One such large, horizontal centrifuge is that taught in Canadian application 2,626,814 to Wick. Rejected solids from a shale shaker are centrifuged in the horizontal centrifuge to separate liquid remaining therein from the solids. The rejected solids have a relatively high solids content of up to 70% or more. The rejected solids are fed into a drum using a feed auger which replaces a feed tube through which fluid would normally be pumped in a conventional horizontal separator. The centrifuge comprises the drum, driven for rotation about a horizontal axis, and an auger which is disposed within the drum. The auger within the drum is rotatable about the horizontal axis and can be rotated at a different speed than the drum. The drum has a tapered portion, the radius becoming smaller at one end than at an opposing end for forming a low bowl angle. The auger has a small clearance between the flights of the auger and the housing. The flighting assists in moving solids from an inlet end to an outlet end while liquid, under the influence of a radially outward force, flows in the small clearance in a direction opposite to the solids. Thus, the liquid is separated from the solids.

There is interest in a centrifugal separator which has a small footprint to permit use in a wide variety of applications and which does not require pumps or augers to transport the feed through the separator. Further, there is interest in a centrifugal separator which recovers liquids from returned drilling mud, the liquid having a rheology suitable for reuse in a drilling operation. More particularly, there is interest in a centrifugal separator which is also capable of handling rejected solids, such as from a shale shaker, the rejected solids having a relatively high solids concentration, typically of up to 70% or greater.

SUMMARY OF THE INVENTION

In an embodiment, a centrifugal separator comprises a bowl and conveyor flighting which are co-rotatable about the vertical axis. The bowl and the conveyor flighting are supported for rotation from beneath, leaving a top of the separator substantially unobstructed for providing inlet access for feeding of a feedstream into the separator, such as by gravity. In further embodiments, a wall of the bowl has a bowl angle of about 2 degrees to about 15 degrees which, when rotated, causes liquids, centrifugally separated therein, to rise within the bowl for recovery at outlets near an upper end of the bowl. The solids, centrifugally separated therein, are directed by the conveyor flighting down the wall of the bowl to outlets near the lower end of the bowl.

In a broad aspect of the invention, a vertical separator is provided for separating liquids from solids in a feedstream, the vertical separator comprising a bowl for rotation about a vertical axis and rotatably mounted from beneath for forming a substantially unobstructed upper end of the bowl. The bowl has a peripheral wall, angled radially outwardly and upwardly towards the upper end of the bowl and has a bowl angle. The bowl has one or more liquid outlets adjacent the peripheral wall at the upper end of the bowl, and one or more solids outlets adjacent a lower end of the peripheral wall. Conveyor flighting for rotation about the vertical axis, is located within the bowl and forms an annular clearance to the peripheral wall, the conveyor flighting being co-rotated with the bowl at a conveyor speed which is different than a bowl speed. The conveyor flighting is rotatably supported from beneath so as to maintain the substantially unobstructed upper end of the bowl while directing solids downwardly to the solids outlets and for passing liquid upwardly along the peripheral wall. An inlet at the upper end of the bowl receives the feedstream into the bowl.

In an embodiment, the feedstream can be introduced to the inlet by gravity. Further, the conveyor speed may be slower than the bowl speed.

In a broad method aspect, a method of recovering liquid from a feedstream comprises providing a vertical separator having a bowl and a conveyor flighting located concentrically therein and forming an annular clearance therebetween, the bowl and conveyor flighting independently co-rotatable about a vertical axis and supported from beneath for providing a feedstream inlet at an unobstructed upper end of the bowl, the bowl having a bowl angle. The bowl is rotated at a bowl speed and the conveyor flighting is co-rotating at a conveyor speed. The feedstream is elevated to above the inlet and the feedstream is fed into the inlet. Liquid, rising along the clearance, is recovered at one or more liquid outlets at the upper end of the bowl. Solids, driven downwardly by the conveyor flighting, are recovered at one or more solids outlets at a lower end of the bowl.

The throughput of the vertical separator is expected to be from about 2.5 to 12 times greater than a conventional horizontal separator. Cantilevering the trunnion and the bowl above bearings and supporting the conveyor flighting from below not only provides the unobstructed access to the bowl, but also minimizes the support frame required to support the vertical separator.

Use of gravity to feed the feedstream to the separator eliminates the need for augers or pumps. In an embodiment, the vertical separator is capable of separating feedstreams which are unpumpable, such as those having a solids content of greater than 70% solid or greater than about 90% solid.

DESCRIPTION OF EMBODIMENTS OF THE INVENTION

Figure 9:
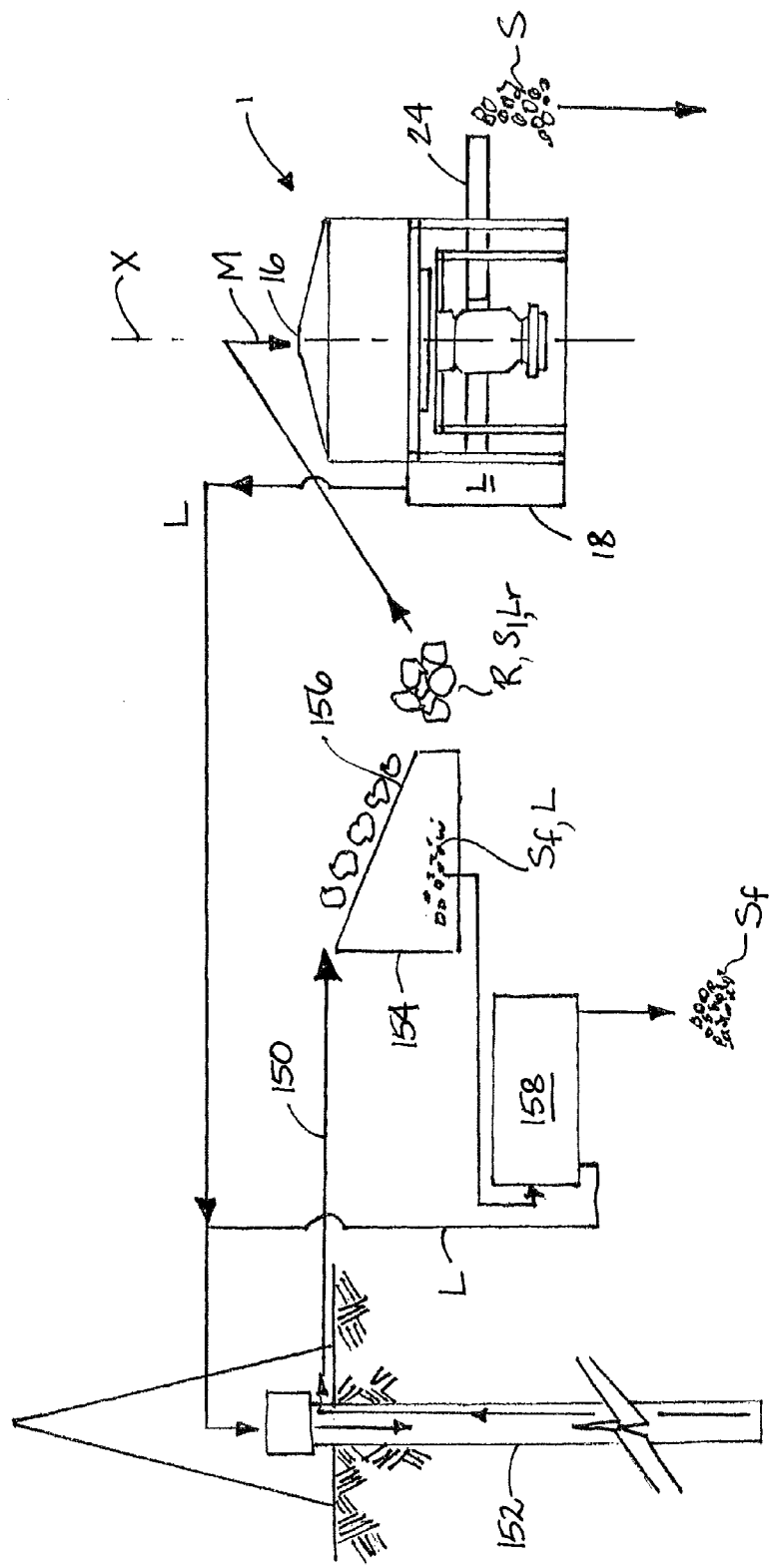
FIG. 9 is a schematic of a drilling mud solids removal system illustrating use of an embodiment vertical separator for gravity receipt of a high-solids overflow feedstream of a shale shaker and separation of liquid from the solids.

With reference to FIG. 9, in one context, an embodiment of a vertical separator 1 is provided to separate liquids L from a feedstream M of liquid L and solids S. The vertical separator implements rotation for centrifugal separation, rotating about a substantially vertical axis X.

Figure 4:
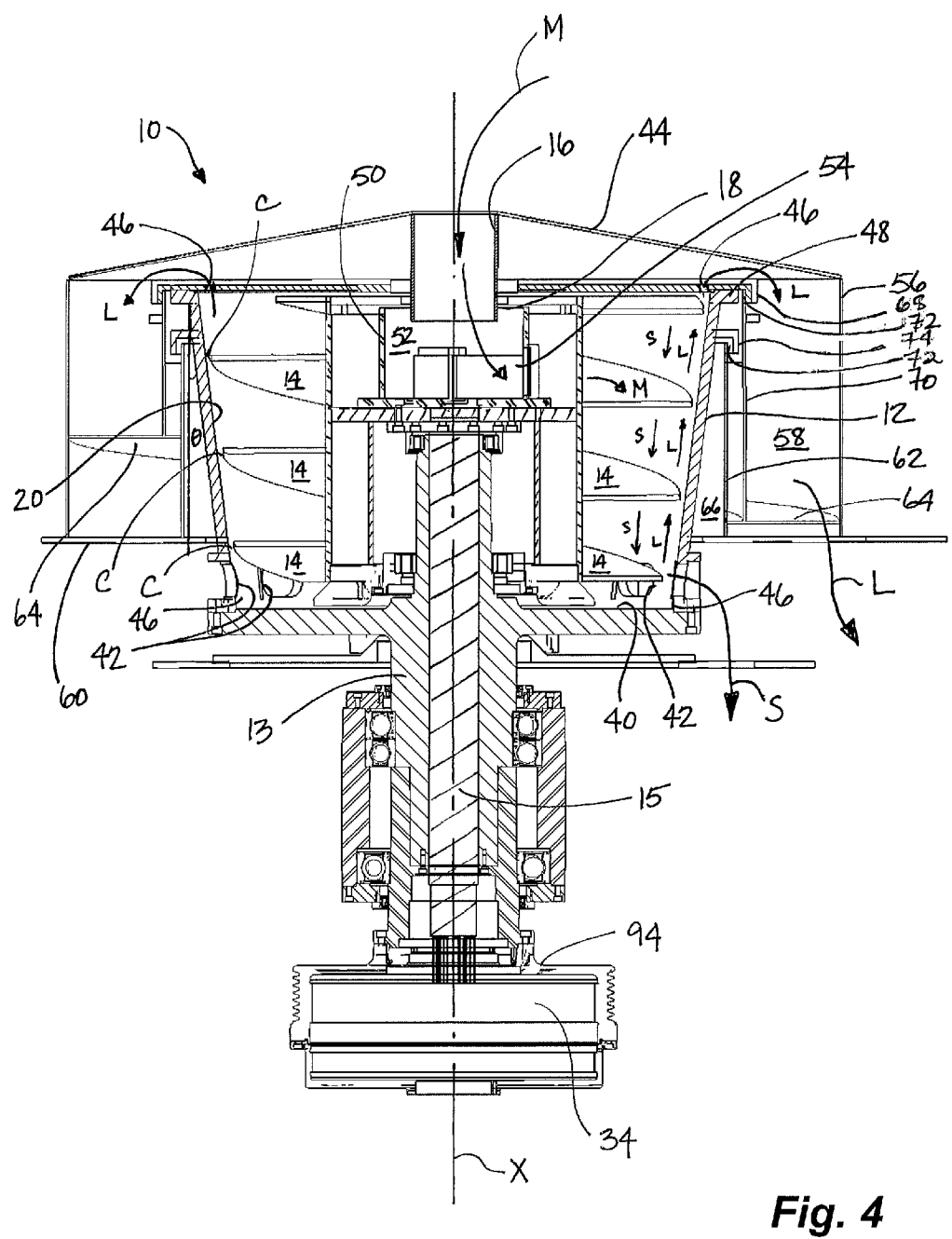
FIG. 4 is a side cross-sectional view of the separator assembly of FIG. 1 having the motor and support structure removed for viewing the separator assembly.

As shown in FIG. 4, one embodiment of a separator assembly 10 comprises a bowl 12 and conveyor flighting 14 located concentrically within the bowl 12, both of which are co-rotating, at different speeds, about axis X. The bowl 12 and conveyor flighting 14 are rotatably supported from beneath and absent rotational support thereabove for maximizing access to an upper end of the bowl 12, which provides a substantially unobstructed inlet 16 for receiving the feedstream M. The bowl 12 has a peripheral wall 20, which is sloped upwardly and outwardly. An annular clearance C is formed between the flighting 14 and the wall 20 for passing liquid L upwardly along the wall 20. In use, the received feedstream M is centrifugally directed radially outwardly to the wall 20 for separation of liquid L flowing upwardly along the slope of the wall 20 and solids S driven downwardly by the flighting 14. Accordingly, solids S can be stripped from liquids L in feedstreams having a low-solids content, such as below about 70% solids and liquid L can be stripped from solids in feedstreams having a high-solids content, such as those having a solids content of about 70% or greater.

Figure 1:
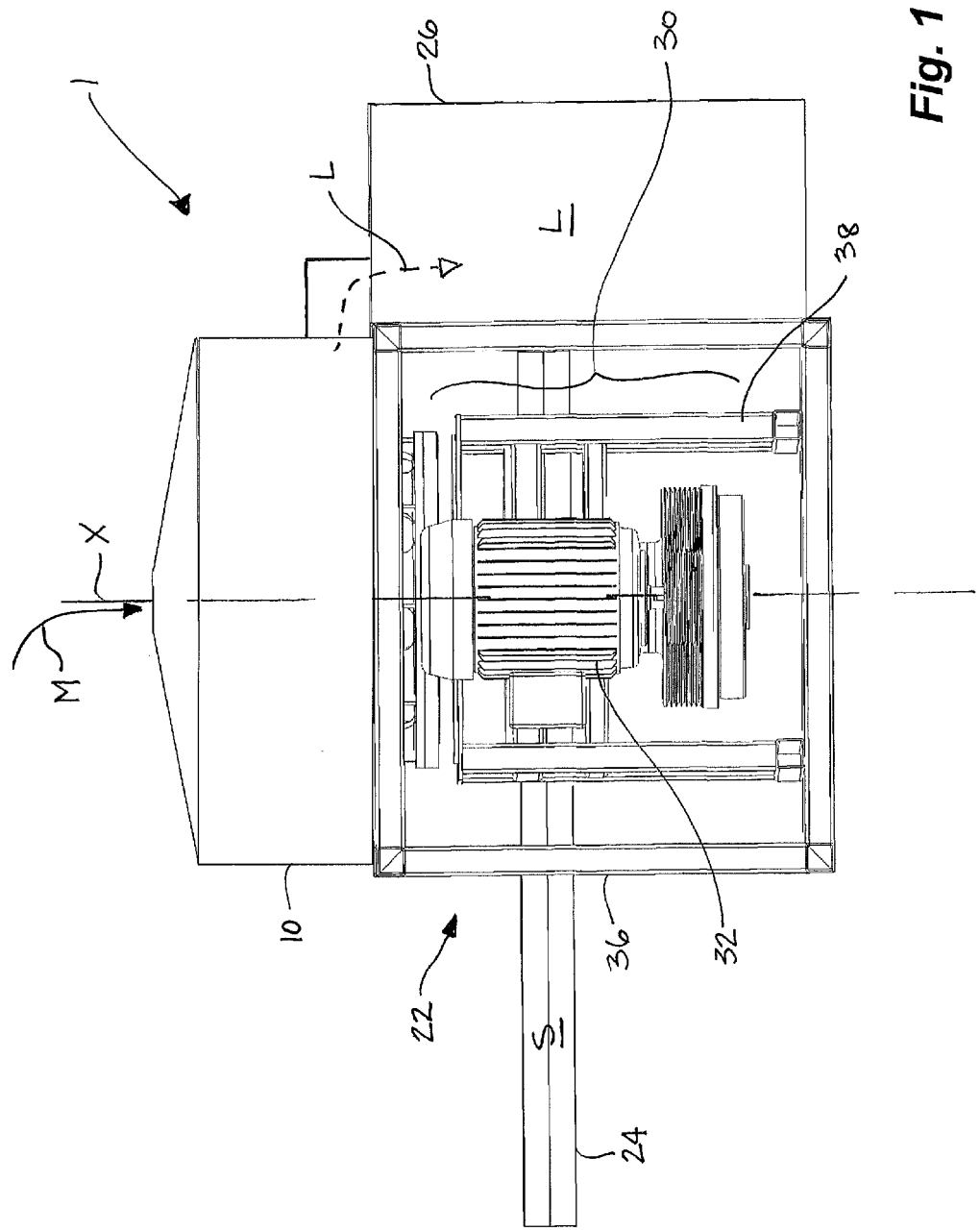
FIG. 1 is a front view of one embodiment of a vertical separator comprising a separator assembly and support structure.
Figure 2:
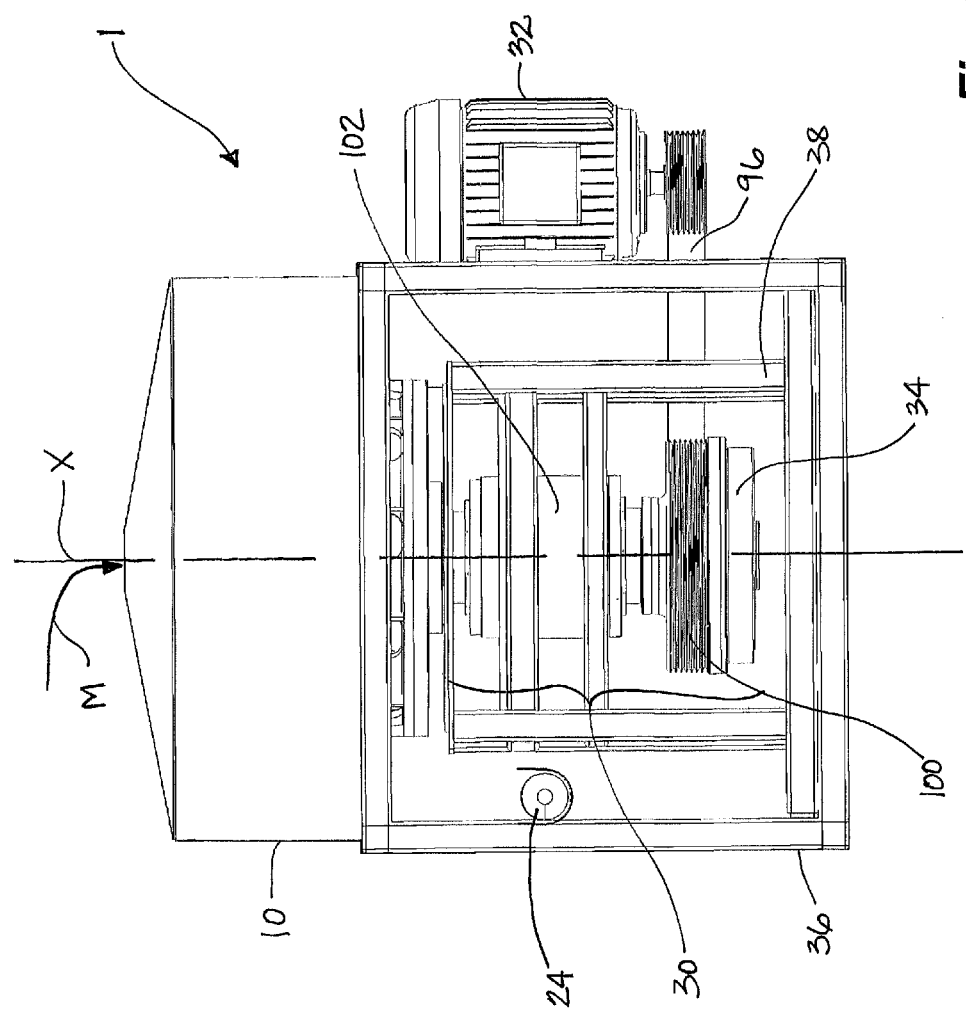
FIG. 2 is an end view according to FIG. 1.
Figure 3:
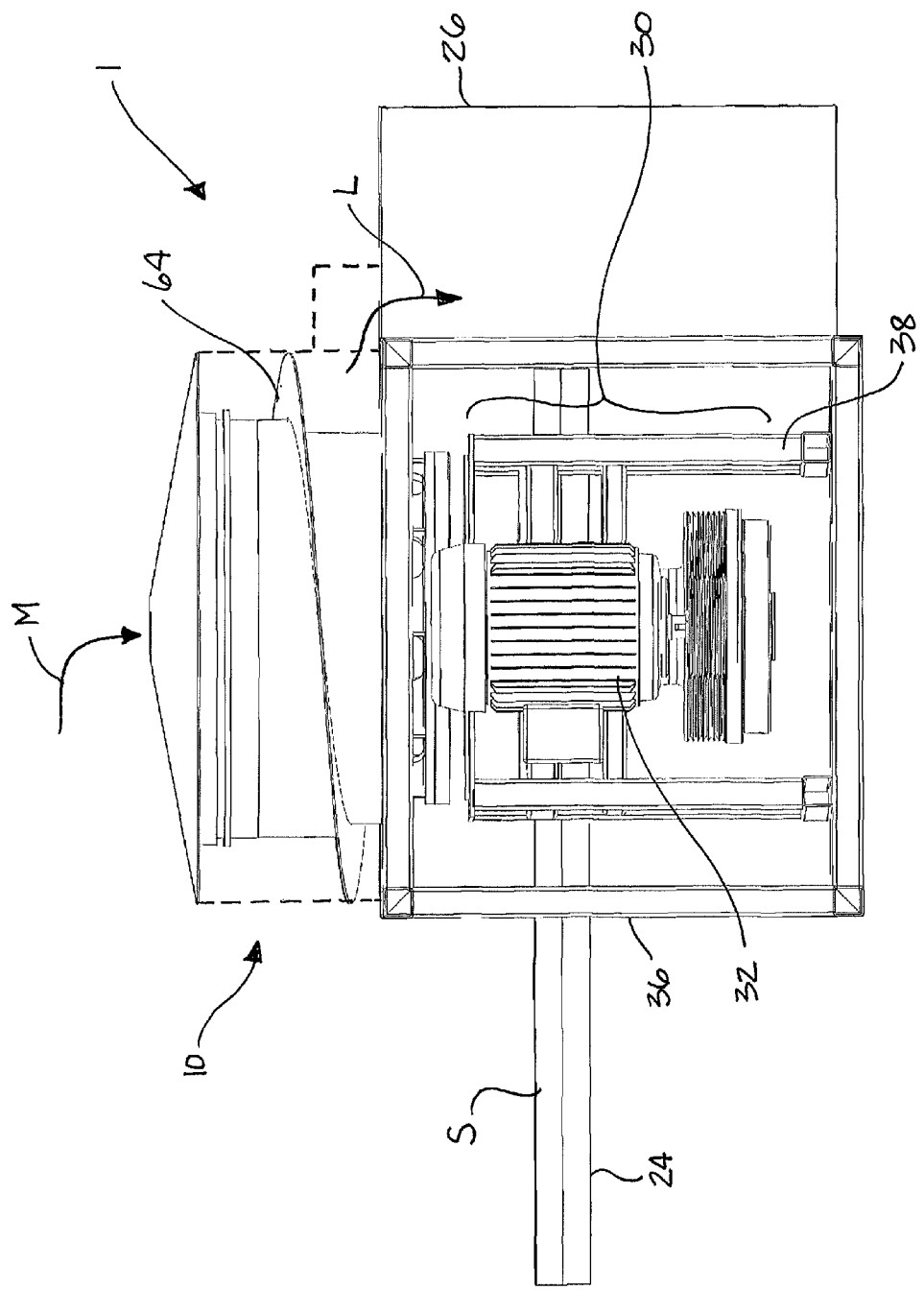
FIG. 3 is a front view of the vertical separator according to FIG. 1, an outer shell shown in dotted lines to better view liquid overflow flighting.

With reference to FIGS. 1, 2 and 3, an embodiment of a vertical separator 1 comprises the separator assembly 10 supported on a support structure 22. The separator assembly 10 implements centrifugal separation components rotatable about a vertical axis X for separation of liquid L from solids S. The separator assembly 10 is fluidly connected to a screw conveyor 24 for removing and transporting separated solids S therefrom and is fluidly connected to an overflow tank 26 for receiving and storing separated liquid L.

The separator assembly 10 further comprises a drive assembly 30 which includes a motor 32 and gear box 34 for rotating the separator assembly 10.

The support structure 22 can be a lower frame 36 which supports at least the separator assembly 10 and a bearing housing frame 38 which further supports the drive assembly 30 and motor 32.

Turning to FIGS. 4 through 8, in more detail, the vertical separator 10 comprises the bowl 12 for liquid handling and the conveyor flighting 14 for solids handling. The bowl 12 and conveyor flighting 14 are driven on concentric shafts 13,15 respectively, but co-rotate at different speeds for differential movement at the annular clearance C.

The bowl 12 is an open topped vessel having the circumferentially-extending peripheral wall 20 and a closed bottom 40. One or more solids outlets 42 are positioned circumferentially adjacent a lower end 46 of the wall 20, such as through the wall 20 or through the bottom 40 of the bowl 12 for discharge of the solids S from the conveyor flighting 14. A collection cowl or the like (not shown) collects solids S for direction into solids conveyor 24.

The bowl 12 is provided with a liquid handling assembly 44 for receiving the feedstream M and discharging separated liquid L. The liquid handling assembly 44 comprises the inlet 16 for receiving and directing feedstream M into the bowl 12, and one or more liquid outlets 46 located adjacent an upper end 48 of the bowl's peripheral wall 20 for receiving uprising separated liquid L.

Figure 5:
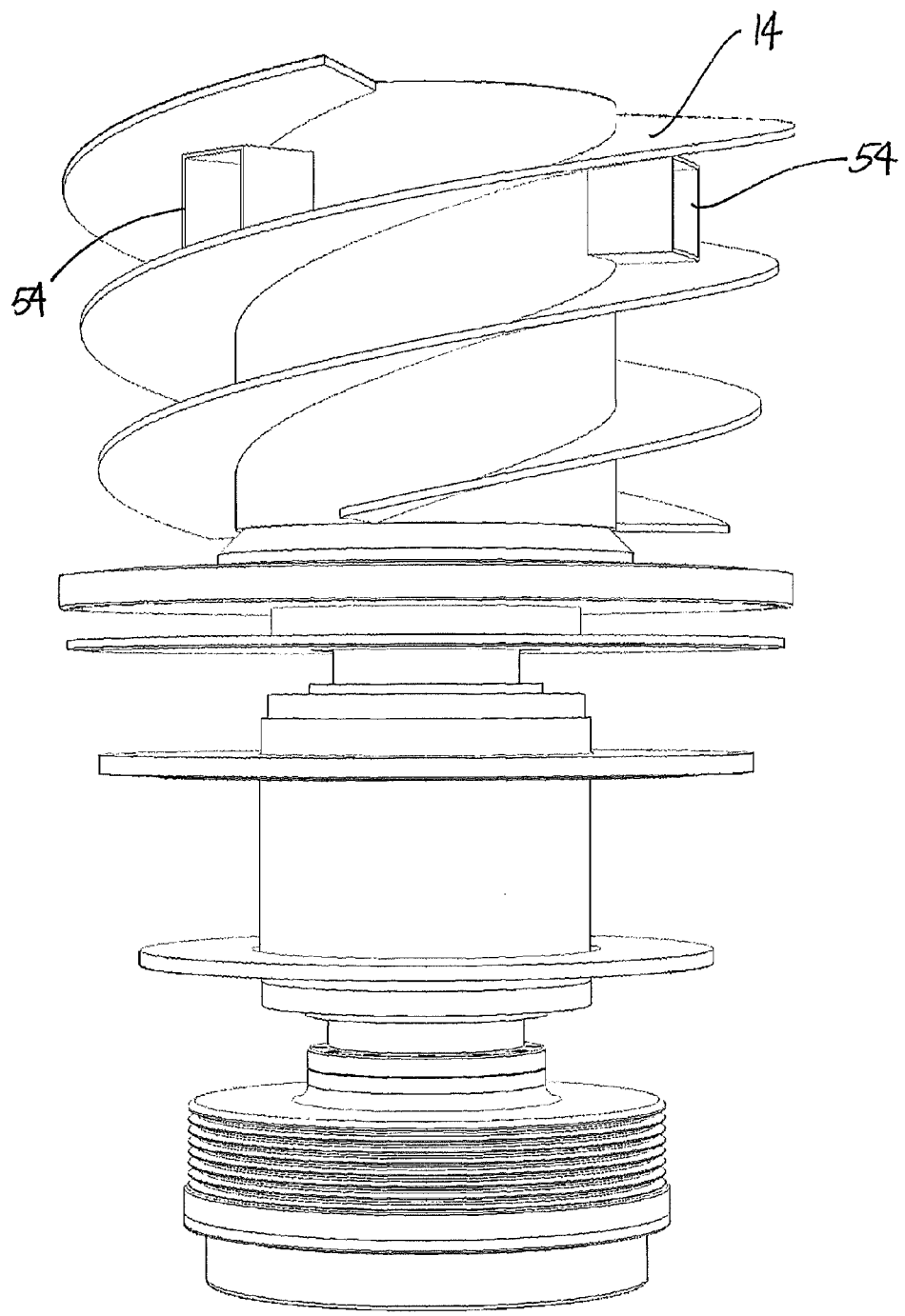
FIG. 5 is a perspective side view of the drive assembly and conveyor flighting assembly of FIG. 4.
Figure 6:
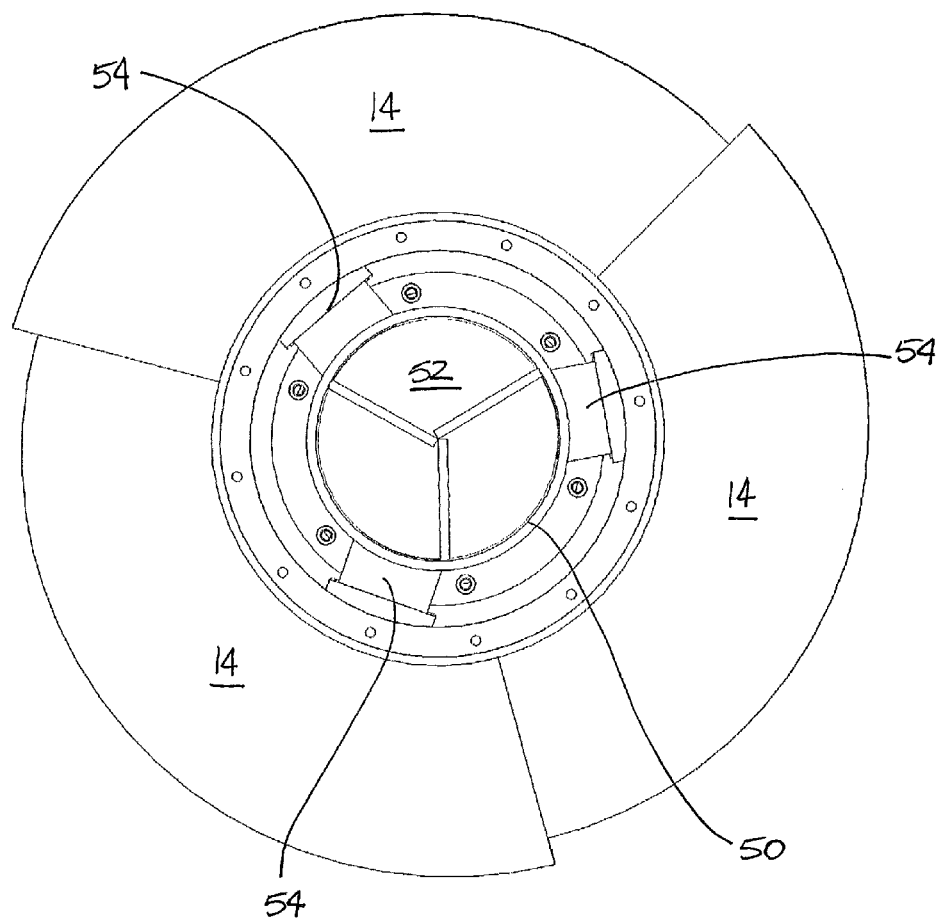
FIG. 6 is a plan view of the conveyor assembly of FIG. 5.

A feed box 50 is fit atop the conveyor flighting 14 for co-rotation therewith and for receiving the feedstream M. Also as shown in FIGS. 5 and 6, the feed box 50 comprises a receiving chamber 52, having one or more radial outlets 54 fit thereto for directing the feedstream M radially outwardly into the conveyor flighting 14 and towards the peripheral wall 20.

The peripheral wall 20 is angled upwardly and radially outwardly to the upper end 48, forming a bowl angle θ. The bowl angle θ can range from about 2° to about 15°. In one embodiment, the bowl angle θ is about 7°. Applicant believes that the outward force created by rotation of the bowl 12, in combination with the bowl angle θ, causes the liquids L to flow upwardly along the peripheral wall 20, along clearance C and past the flighting 14, towards the one or more liquid outlets 46. Simultaneously, the flighting 14 conveys the solids S downwardly toward the one or more solids outlets 42.

In one embodiment, the conveyor flighting 14 is co-rotated with the bowl 12 at a speed which is slower than the bowl speed. In an example, the bowl 12 is rotated at a rotational speed in a range from about 500 rpm to about 1000 rpm and the conveyor flighting 14 is rotated at speeds about 4 rpm to about 8 rpm slower than that of the bowl 12. The differential speed enables the conveyor flighting 14 to scrape solids S from the wall 20 and otherwise urge solids S downwardly as the flighting 14 passes thereby. In another embodiment, where the conveyor flighting 14 rotates faster than the bowl 12, a pitch of the flighting 14 is reversed.

The liquid handling assembly 44 further comprises a stationary and tubular outer shell 56, supported from the support structure 22 and which houses the rotating bowl 12 and is spaced radially outward from the bowl 12 for forming an outer annular chamber 58 therebetween. The chamber 58 is bounded by the outer shell 56, a floor 60 and a tubular, inner wall 62 extending upwardly from the floor 60. Liquid L rises upwardly and spills over the upper end 48 of the peripheral wall 20, such as through the one or more liquid outlets 46. Chamber 58 is fluidly connected to the overflow tank 26. In an embodiment, best seen in FIGS. 3 and 4, overflow flighting 64, positioned within the outer annular chamber 58, directs the liquid L received therein to the overflow tank 26.

Figure 8:
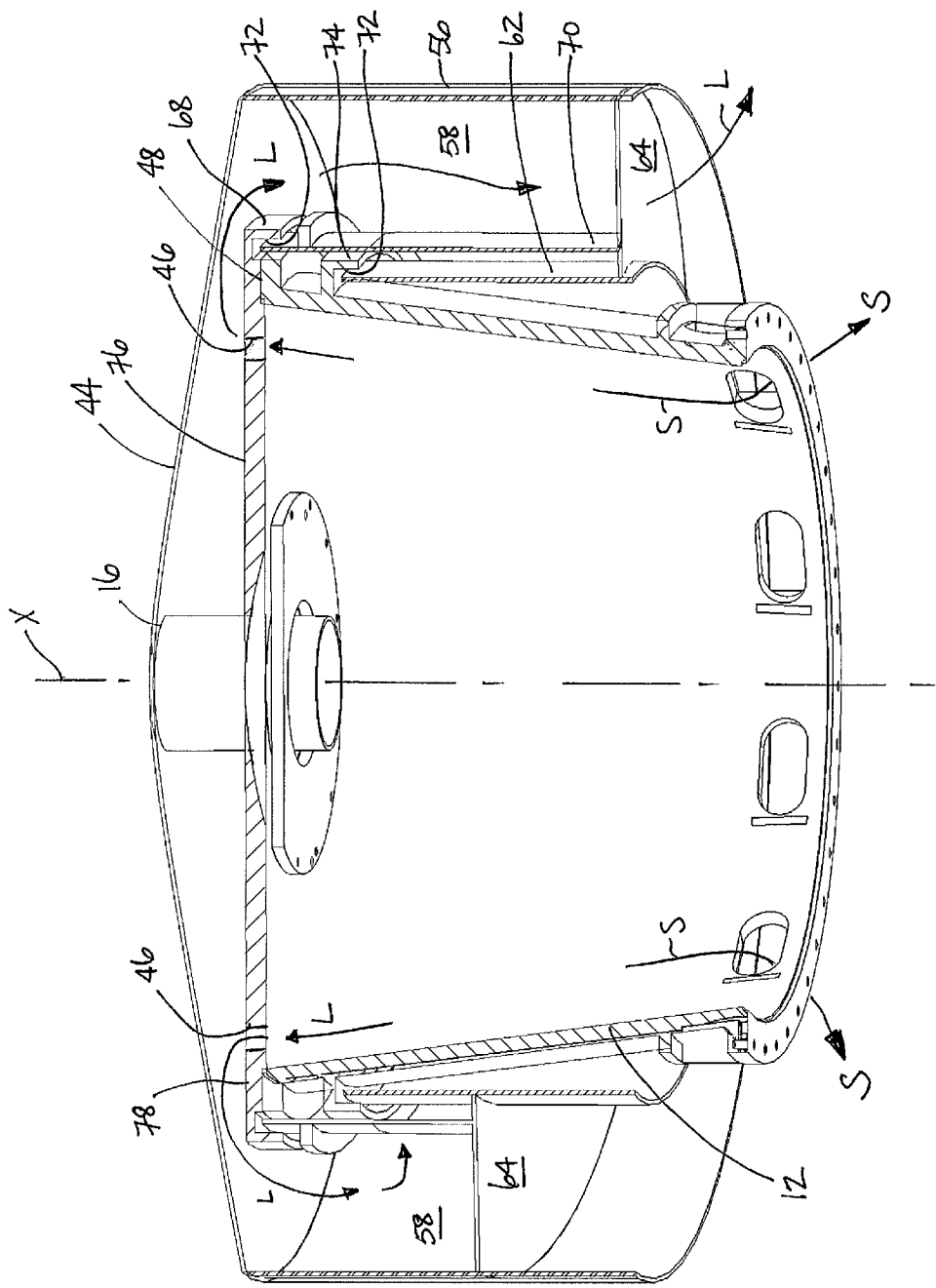
FIG. 8 is a side, cross-sectional view of a bowl and liquid collection assembly.

As shown in FIGS. 4 and 8, the liquid handling assembly 44 also comprises means for sealing between the rotating bowl 12 and non-rotating outer shell 56 and chamber 58. The inner wall 62 of the outer annular chamber 58 forms an annular gap 66 between the stationary inner wall 62 and the rotating peripheral wall 20. The inner wall 62 is supported on the floor 60. The floor 60 is also spaced radially from the bowl 12. A labyrinth-type of seal can be formed comprising a drip lip 68 formed about the bowl's upper end 48 and for co-rotation therewith. The drip lip 68 depends below structure extending upwardly from the floor 60 and spaced radially inwardly of the drip lip 68 as a liquid seal for directing liquid L over and off of the lip 68 and into the chamber 58 without loss into the annular gap 66. The inner wall 62, or a secondary wall 70, extending upwardly from the overflow flighting 64, can extend upwardly to reside in an annular groove 72 formed between the peripheral wall 20 and the lip 68. As shown in FIG. 4, the drip lip 68 cooperates with secondary wall 70 and an inner drip lip 74 cooperates with the inner wall 62 as a further seal against liquid L entering the annular gap 66.

With reference to FIG. 8, an embodiment of the liquid handling assembly 44 comprises a liquid end plate 76 covering the upper end 48 of the bowl 12 and has the one or more liquid outlets 46 formed therein and spaced circumferentially about a periphery 78 to permit liquids L to leave the bowl 12. The one or more liquid outlets 46 are fluidly connected to the outer chamber 58. In this embodiment the drip lip 68 extends downwardly from the liquid end plate 76 and extends circumferentially thereabout for cooperation with the secondary wall 70 for guiding liquids L to the outer chamber 58. Further, the additional inner descending drip lip 74 extends downwardly from the peripheral wall 20 for cooperation with the inner wall 62 to prevent liquids L from entering between the inner wall 62 and the bowl 12.

Figure 7A:
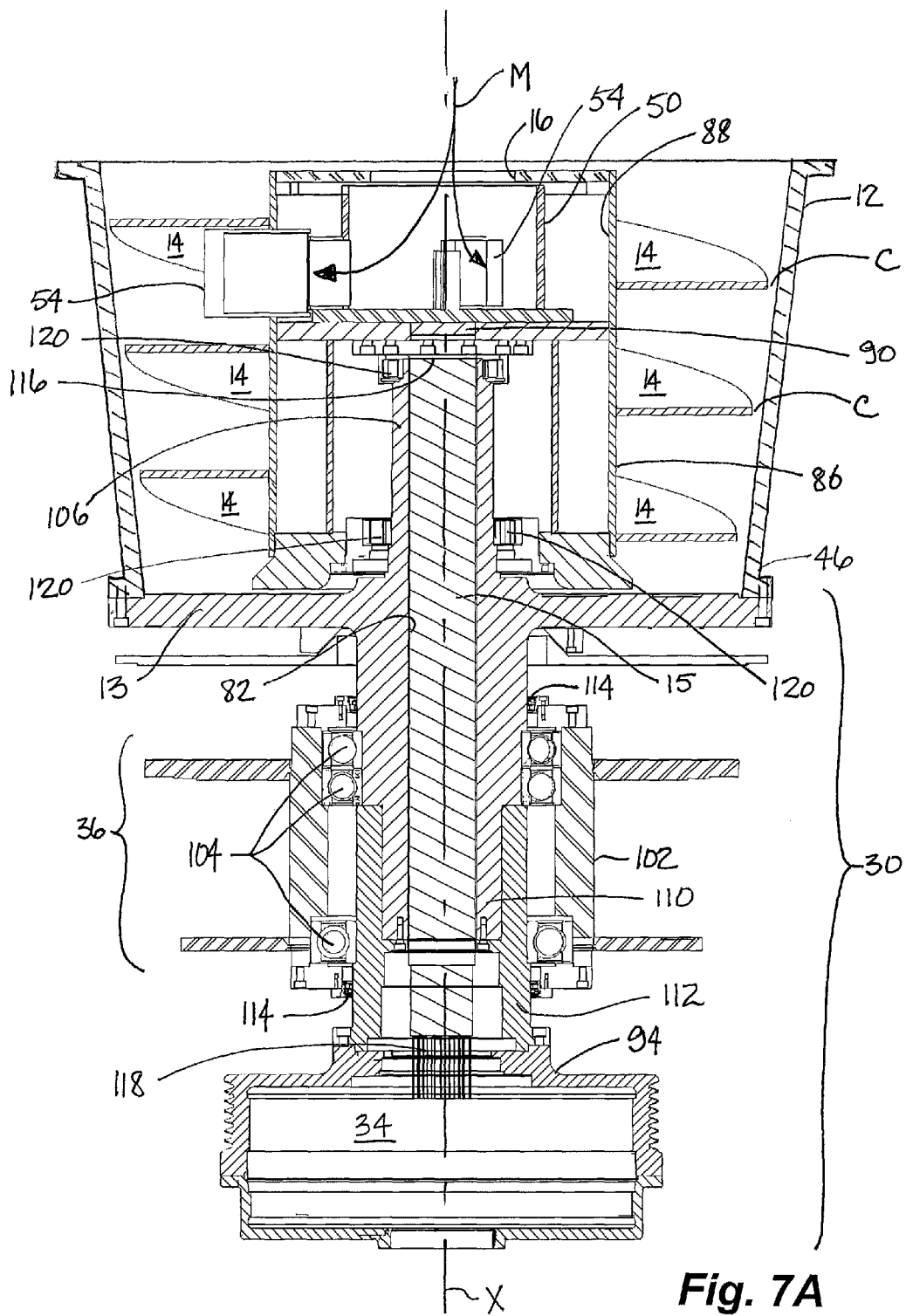
FIG. 7A is a side cross-sectional view of the drive and conveyor flighting assemblies of FIG. 5.
Figure 7B:
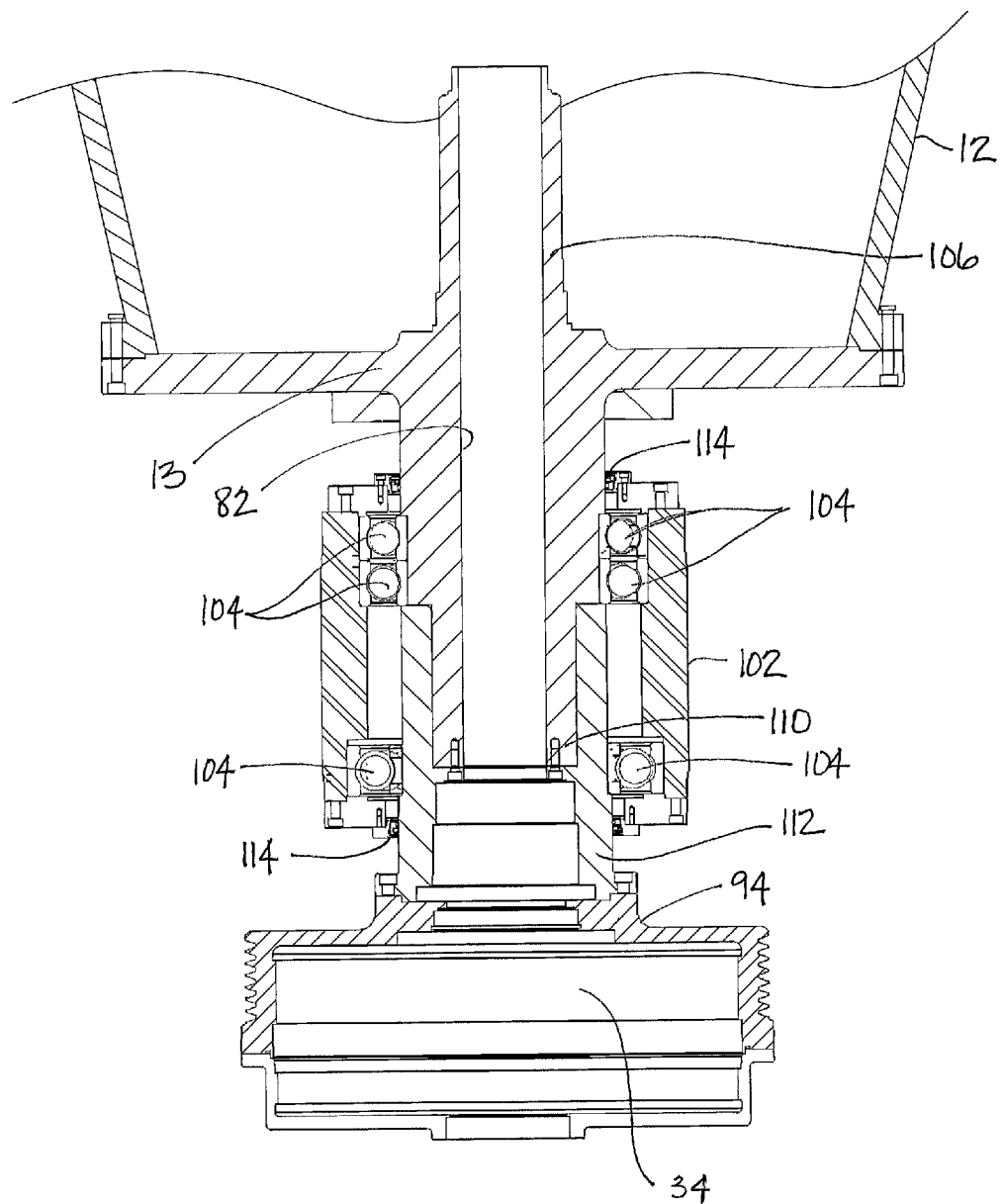
FIG. 7B is a partial side, cross-sectional view of the drive assembly of FIG. 7A with the bowl supported on a trunnion.
Figure 7C:
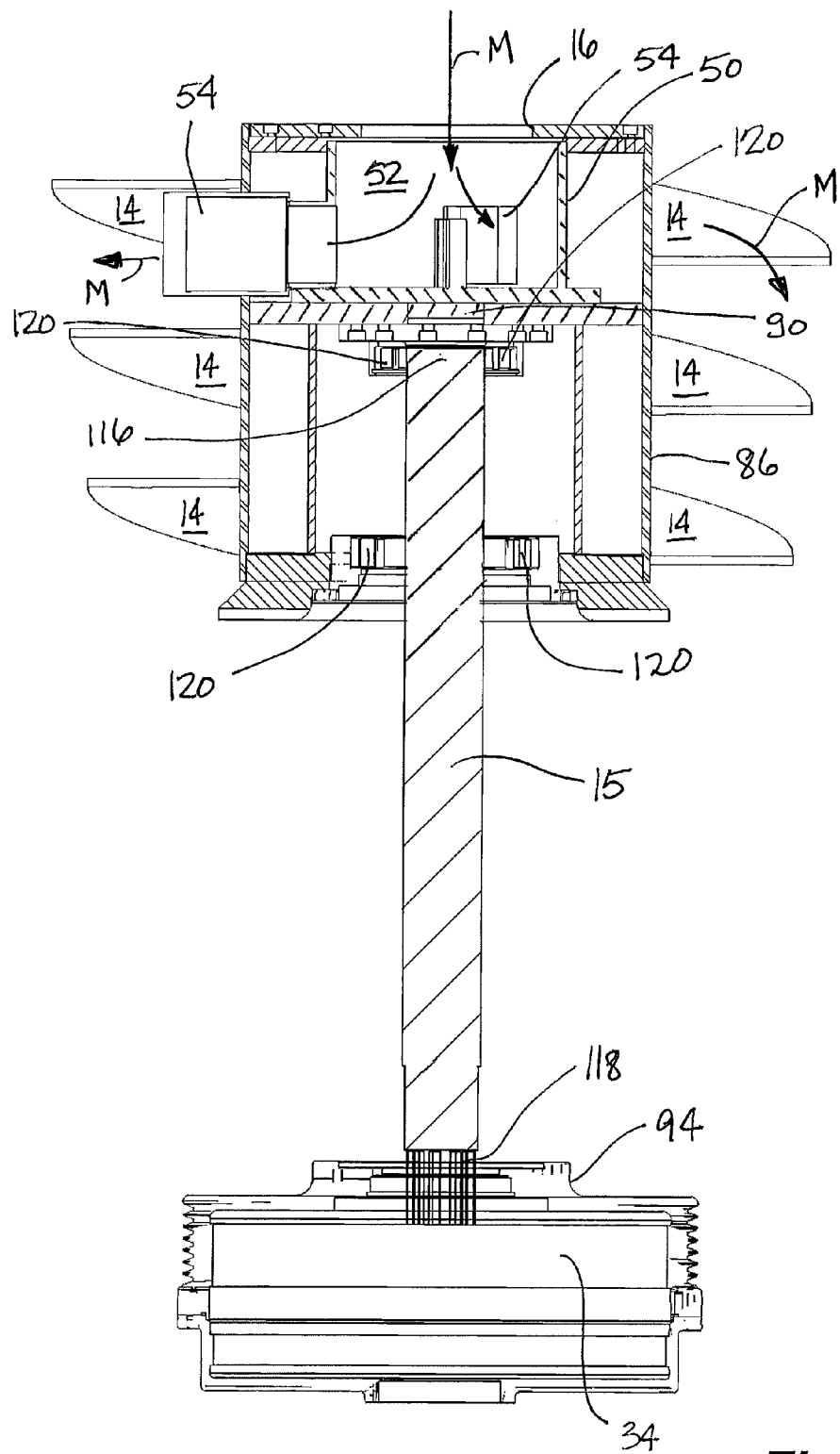
FIG. 7C is a partial, side cross-sectional view of the conveyor flighting assembly according to FIG. 7A and drive shaft portion of the drive assembly.

Best seen in FIGS. 7A and 7C, the bowl 12 is rotatably supported upon the rotatable shaft or trunnion 13 having a central bore 82. The trunnion 13 can form part of the bowl 12. The conveyor flighting 14 is rotatably supported upon the shaft 15, which upwardly extends through the trunnion 13. The trunnion 13 and shaft 15 are part of the drive assembly 30. The conveyor flighting 14 is supported upon a tubular conveyor body 86. The feed box 50 is formed within a bore 88 of the conveyor body 86. The conveyor body 86 is supported for rotation upon a conveyor thrust plate 90, which can also form a base of the feed box 50. The thrust plate 90 is supported upon the shaft 15. The conveyor flighting 14 extends radially and descends helically about the body 86 from the feed box 50 to a lower end adjacent the lower end 46 of the bowl 12. The one or more tangential outlets 54 extend through the feed box 50 for fluidly connecting the inlet 16 to the bowl 12. The one or more tangential outlets 54 extend substantially perpendicular to the vertical axis X of the bowl 12 for discharging feed toward the wall 20 of the bowl 12. A liquid end ring 92 provides a clearance seal between the rotating feed box 50 and the stationary inlet 16.

The drive assembly 30 co-rotates the bowl 12 and the conveyor flighting 14. The bowl 12 and the conveyor flighting 14 rotate at similar yet different speeds. A variety of drive means could be used including a drive for each of the separate trunnion 13 and shaft 15, or as shown in this embodiment, a single drive having an outer housing 94 which is driven by motor 32 at a first trunnion speed and having a central shaft output, driven at a second lower flighting speed.

As shown in FIG. 2, and in an embodiment, a single motor 32 is used to drive both the bowl 12 and the conveyor flighting 14. A motor belt 96 drives a gear box 34, such as through an integrated sheave 100 about the gear box 34.

Best seen in FIGS. 7A and 7B, the trunnion 13 extends upwardly from the gear box 34 for rotation therewith. The gear box 34 has an output and shaft 15 extends upwardly therefrom and through trunnion bore 82, for independent and differential rotation of the conveyor flighting 14. The trunnion 13 is cantilevered for rotation at a bearing housing 102 supported from the support structure 22 and below the bowl 12.

As shown in FIG. 7B, the trunnion 13 is rotatably supported within the bearing housing 102 using a plurality of radial and thrust bearings 104. The bowl 12 is operatively mounted to the trunnion 13. Rotatably supporting the trunnion 13 and bowl 12 from beneath eliminates the need for drive structure to extend above the bowl 12, which would interfere with the conveyor flighting 14 and feedstream access. As a result, the upper end 48 of the bowl 12 remains unobstructed and permits the inlet 16 to be maximized, such as for gravity feed of the feedstream thereto.

The trunnion 13 forms a hollow, upstanding shaft 106 which extends upwardly into the bore 88 of the conveyor body 86. The upstanding shaft 106 is the support for rotation of the conveyor flighting 14 thereabout. A lower end 110 of the trunnion 13 is connected to a gear box flange 112 which extends upwardly from the gear box housing 94 therebelow. The bearing housing 102 further comprises seals 114 for sealing between the trunnion 13 and the bearing housing 102 and between the bearing housing 102 and the gear box flange 112.

As shown in FIGS. 7A and 7C, the thrust shaft 15, extends through the bore 82 in the trunnion 13, and is operatively connected at an upper end 116 to the thrust plate 90 of the conveyor body 86, and at a lower end 118 to the gear box 34. Conveyor bearings 120 are housed on the shaft portion 106 of the trunnion 13 for supporting co-rotation of the conveyor body 86 and conveyor flighting 14 thereabout. While details of the gear box 34 are not shown, the housing 94 and shaft 15 co-rotate independently, such as available using a double reduction planetary drive. The bowl 12 is rotated at the rotational speed of the gear box housing 94. The gear box 34 acts to slow the speed of the shaft 15 to the desired conveyor speed, as is understood by one of skill in the art.

In Use

As shown in FIG. 9 in a mud drilling embodiment a slurry, such as drilling mud 150 returned from a wellbore 152, is first passed over a conventional shale shaker 154 for separation of fine solids $S_f$ and liquids L from the drilling mud 150, and for rejecting large solids $S_l$ therefrom. Liquid L and solids $S_f$ pass through a screen 156 of the shale shaker 154 and are subjected to further separation using a conventional separator 158, such as a horizontal separator, to remove the fine solids $S_f$ and to recover the liquid L for reuse.

Rejected materials R, which cannot pass through the shale shaker screen 156, comprise the larger solids $S_l$ and some residual liquid $L_r$, associated therewith. Typically, the rejected material R comprises up to about 90% solid $S_l$ and 10% liquid L. The rejected material R is carried by means, such as a conveyor or auger, to a location above an embodiment of the vertical separator 1. The rejected material R forms the feedstream M to the vertical separator 1, fed by gravity through the inlet 16 to the bowl 12 for stripping residual liquid $L_r$ therefrom.

With reference also to FIG. 4 as necessary, the bowl 12 of the vertical separator 1 is rotated from about 500 rpm to about 1000 rpm and the conveyor flighting 14 therein is rotated slightly slower or at about 4 rpm to about 8 rpm slower. Substantially dry solids S are directed to the screw conveyor 24 to be transported therefrom for disposal. The liquid L is collected in the overflow tank 26 where it can be accessed for reuse.

Embodiments of the vertical separator 1 are expected to have a throughput from about 2.5 to 12 times greater than a conventional horizontal separator. The throughput of vertical separators is expected to be up to about 6 m³/min compared to a conventional horizontal separator of comparable sizing which has a conventional throughput of about 0.5 m³/min to about 2.5 m³/min.

The embodiments of the invention for which an exclusive property or privilege is claimed are defined as follows:

1. A vertical separator, for separating liquids from solids in a feedstream, comprising:
    a bowl for rotation about a vertical axis, rotatably supported from beneath the bowl and absent rotational support thereabove, the bowl having
        a peripheral wall, angled radially outwardly and upwardly towards the upper end of the bowl and having a bowl angle,
        one or more liquid outlets adjacent the peripheral wall at the upper end of the bowl, and
        one or more solids outlets adjacent a lower end of the peripheral wall;
    conveyor flighting for rotation about the vertical axis and located within the bowl and forming an annular clearance to the peripheral wall, the conveyor flighting being co-rotated with the bowl at a conveyor speed which is different than a bowl speed, and being rotatably supported only from beneath, being absent rotational support thereabove so as to direct solids downwardly to the solids outlets and for passing liquid upwardly along the peripheral wall;
    an inlet at the upper end of the bowl being unobstructed for receiving the feedstream therethrough and into the bowl;
    an annular chamber supported about the bowl for receiving liquid; and
    a seal between the rotating bowl and the annular chamber, wherein the seal further comprises:
        a first downwardly extending lip formed circumferentially about the peripheral wall and forming a first annular groove between the lip and the wall;
        an upwardly extending first inner wall of the annular chamber for extending into the first annular groove,
        a second downwardly extending lip formed circumferentially about the peripheral wall, radially outward of the first inner wall and forming a second annular groove between the lip and the wall; and
        a second upwardly extending inner wall of the annular chamber for extending into the second annular groove, wherein
    liquids from the bowl are directed along the second lip and into the annular chamber.

2. The vertical separator of claim 1 further comprising concentric shafts for rotatably supporting the bowl and the conveyor flighting, a first shaft for supporting the bowl and having a bore, and a second shaft extending rotatably through the bore for supporting the conveyor flighting.

3. The vertical separator of claim 2 wherein the concentric shafts comprise:
    a trunnion for rotatably supporting the bowl, and
    a thrust shaft extending through the bore of the trunnion for rotatably supporting the conveyor flighting.

4. The vertical separator of 3 further comprising:
    a bearing housing supported beneath the bowl, and
    support bearings for supporting the trunnion for rotation in the bearing housing.

5. The vertical separator of claim 3 further comprising:
    conveyor bearings supported between the trunnion and the conveyor flighting for rotatably supporting the conveyor flighting thereon.

6. The vertical separator of claim 1 further comprising:
    a drive assembly for co-rotation of the bowl and the conveyor flighting, the drive assembly comprising:
    a first drive for rotating the bowl at the bowl speed, and
    a second drive for rotating the conveyor flighting at the conveyor speed.

7. The vertical separator of claim 1 further comprising a drive assembly for co-rotation of the bowl and the conveyor flighting, the drive assembly comprising a gear box for co-rotating both of the bowl and the conveyor flighting.

8. The vertical separator of claim 7 wherein the gear box has a housing and a gear box output, further comprising
    concentric shafts for rotatably supporting the bowl and the conveyor flighting, a trunnion for supporting the bowl and having a bore, and a thrust shaft extending rotatably through the bore for supporting the conveyor flighting; and
    a motor for rotating the gear box housing at the bowl speed, and wherein
    the trunnion is connected to the housing for rotation at the bowl speed, and
    the thrust shaft is connected to the gear box output for rotation at the conveyor speed.

9. The vertical separator of claim 1 wherein the conveyor speed is slower than the bowl speed.

10. The vertical separator of claim 9 wherein the conveyor speed is about 4 rpm to about 8 rpm slower than the bowl speed.

11. The vertical separator of claim 1 wherein the bowl has a bowl angle of from about 2 degrees to about 15 degrees from the vertical axis.

12. The vertical separator of claim 11 wherein the bowl angle is about 7 degrees.

13. The vertical separator of claim 3 wherein the conveyor flighting further comprises:
a tubular conveyor body upon which flighting extends radially and descends helically thereabout, the body further comprising:
a feed box adjacent the inlet for receiving the feedstream; and
a plurality of radial discharge ports extending through the body for directing the feedstream from the inlet to the bowl.

14. The vertical separator of claim 13 wherein the body further comprises a thrust plate positioned between the feed box and thrust shaft for operatively connecting the conveyor flighting to the thrust shaft.

15. The vertical separator of claim 1 wherein seal further comprises:
at least a first downwardly extending lip formed circumferentially about the peripheral wall and forming an annular groove between the lip and the wall; and
at least a first upwardly extending inner wall of the annular chamber for extending into the annular groove, wherein liquids from the bowl are directed over the lip and into the annular chamber.

16. The vertical separator of claim 1 further comprising:
an outer shell supported and spaced radially outwardly about the bowl for forming an outer annular chamber therebetween, the outer chamber further comprising:
a floor, and
an inner wall extending upwardly from the floor, and
a seal between the rotating bowl and the inner wall, wherein the outer annular chamber is fluidly connected to the one or more liquid outlets for receiving the liquids therein.

17. The vertical separator of claim 16 wherein the outer annular chamber further comprises overflow flighting extending thereabout for directing the liquids out of the chamber.

18. The vertical separator of claim 1 further comprising:
a end plate covering the upper end of the bowl, the one or more liquid outlets being formed circumferentially about a periphery of the end plate for fluidly connecting the one or more liquid outlets to the annular chamber.

19. The vertical separator of claim 1 further comprising:
a support frame for rotatably supporting the bowl and conveyor flighting thereon.

20. The vertical separator of claim 19 further comprising:
a screw conveyor supported on the support frame below the one or more solids outlets for receiving solids therefrom for transporting the solids from the vertical separator.

21. The vertical separator of claim 1 wherein the feedstream is rejected solids from a shale shaker comprising solids and drilling fluid.

22. The vertical separator of claim 21 wherein the feedstream comprises a solids content of 70% or greater.

23. The vertical separator of claim 21 wherein the feedstream comprises a solids content of 90% or greater.

24. A method of recovering liquid from a feedstream containing liquid and solids, the method comprising:
providing a vertical separator having a bowl for rotation about a vertical axis, rotatably supported from beneath the bowl and absent rotational support thereabove, the bowl having
a peripheral wall, angled radially outwardly and upwardly towards the upper end of the bowl and having a bowl angle,
one or more liquid outlets adjacent the peripheral wall at the upper end of the bowl, and
one or more solids outlets adjacent a lower end of the peripheral wall;
conveyor flighting for rotation about the vertical axis and located within the bowl and forming an annular clearance to the peripheral wall, the conveyor flighting being co-rotated with the bowl at a conveyor speed which is different than a bowl speed, and being rotatably supported only from beneath, being absent rotational support thereabove so as to direct solids downwardly to the solids outlets and for passing liquid upwardly along the peripheral wall;
an inlet at the upper end of the bowl being unobstructed for receiving the feedstream therethrough and into the bowl;
an outer shell supported and spaced radially outwardly about the bowl for forming an outer annular chamber therebetween the outer chamber further comprising:
a floor, and
an inner wall extending upwardly from the floor;
a seal between the rotating bowl and the inner wall, wherein the outer annular chamber is fluidly connected to the one or more liquid outlets for receiving the liquids therein; and
overflow flighting extending thereabout the outer annular chamber for directing the liquids out of the chamber;
rotating the bowl at a bowl speed;
co-rotating the conveyor flighting at a conveyor speed;
elevating the feedstream to above the inlet;
feeding the feedstream into the inlet;
recovering liquid rising along the clearance at one or more liquid outlets at the upper end of the bowl; and
recovering solids driven downwardly by the conveyor flighting at one or more solids outlets at a lower end of the bowl.

25. The method of claim 24 wherein the co-rotating of the conveyor flighting at a conveyor speed slower than the bowl speed.

26. The method of claim 24 wherein rotating the bowl at a bowl speed comprises:
rotating the bowl at a speed of about 500 rpm to about 1000 rpm, and
co-rotating of the conveyor flighting at a conveyor speed comprises rotating the conveyor flighting at a speed of about 4 rpm to about 8 rpm less than that of the bowl speed.

27. The method of claim 24 further comprising gravity feeding the feedstream into the inlet.

28. The method of claim 24 further comprising recovering liquid rising along the clearance at a bowl angle of about 2 degrees to about 15 degrees.

29. The method of claim 24 wherein the feedstream is a drilling fluid.

30. The method of claim 24 wherein the feedstream is rejected shale shaker materials having residual liquids and a solids content of 70% or greater.

31. A vertical separator, for separating liquids from solids in a feedstream, comprising:
a bowl for rotation about a vertical axis, rotatably supported from beneath the bowl and absent rotational support thereabove, the bowl having
a peripheral wall, angled radially outwardly and upwardly towards the upper end of the bowl and having a bowl angle, one or more liquid outlets adjacent the peripheral wall at the upper end of the bowl, and one or more solids outlets adjacent a lower end of the peripheral wall;

conveyor flighting for rotation about the vertical axis and located within the bowl and forming an annular clearance to the peripheral wall, the conveyor flighting being co-rotated with the bowl at a conveyor speed which is different than a bowl speed, and being rotatably supported only from beneath, being absent rotational support thereabove so as to direct solids downwardly to the solids outlets and for passing liquid upwardly along the peripheral wall;

an inlet at the upper end of the bowl being unobstructed for receiving the feedstream therethrough and into the bowl;

an outer shell supported and spaced radially outwardly about the bowl for forming an outer annular chamber therebetween, the outer chamber further comprising:

a floor, and an inner wall extending upwardly from the floor;

a seal between the rotating bowl and the inner wall, wherein the outer annular chamber is fluidly connected to the one or more liquid outlets for receiving the liquids therein; and overflow flighting extending thereabout the outer annular chamber for directing the liquids out of the chamber.

32. The vertical separator of claim 31 wherein the concentric shafts comprise:

a trunnion for rotatably supporting the bowl, and a thrust shaft extending through the bore of the trunnion for rotatably supporting the conveyor flighting.

33. The vertical separator of 31 further comprising:

a bearing housing supported beneath the bowl, and support bearings for supporting the trunnion for rotation in the bearing housing.

34. The vertical separator of claim 31 further comprising:

conveyor bearings supported between the trunnion and the conveyor flighting for rotatably supporting the conveyor flighting thereon.

35. The vertical separator of claim 31 wherein the conveyor flighting further comprises:

a tubular conveyor body upon which flighting extends radially and descends helically thereabout, the body further comprising:

a feed box adjacent the inlet for receiving the feedstream; and a plurality of radial discharge ports extending through the body for directing the feedstream from the inlet to the bowl.

* * * * *